United States Patent [19]

Powell et al.

[11] 4,063,538

[45] Dec. 20, 1977

[54] IGNITION TIMING CONTROL METHOD AND APPARATUS

[75] Inventors: John David Powell, Menlo Park; Mont Hubbard, Davis; Robert R. Clappier, Los Altos, all of Calif.

[73] Assignee: The Board of Trustees of Leland Stanford Junior University, Stanford, Calif.

[21] Appl. No.: 657,443

[22] Filed: Feb. 12, 1976

[51] Int. Cl.² ............................ F02P 5/10; F02P 5/06; F02P 5/08
[52] U.S. Cl. .............................. 123/117 R; 123/148 E; 123/146.5 A
[58] Field of Search .................... 123/146.5 A, 148 E, 123/117 R

[56] References Cited

U.S. PATENT DOCUMENTS

| 3,875,912 | 4/1975 | Bullo | 123/148 E |
| 3,955,723 | 5/1976 | Richards | 123/148 E |
| 3,968,778 | 7/1976 | Gambill | 123/148 E |

*Primary Examiner*—Verlin R. Pendegrass
*Assistant Examiner*—Thomas H. Webb
*Attorney, Agent, or Firm*—Naylor, Neal & Uilkema

[57] ABSTRACT

A method and apparatus for controlling the ignition timing in an internal combustion engine. The angular position of peak cylinder pressure is measured and to the extent such angular position deviates from a preselected set point, the time of spark ignition is advanced or retarded to restore the position of peak cylinder pressure to the set point.

4 Claims, 8 Drawing Figures

IGNITION TIMING CONTROL METHOD AND APPARATUS

BACKGROUND OF THE INVENTION

1. Field of the Invention

This invention relates to a method and apparatus for controlling ignition timing to accommodate variations in load and speed changes and ambient conditions, and more particularly to a method and apparatus that achieves the foregoing by adjusting the angular position of spark ignition to maintain substantially constant the angular position of peak cylinder pressure.

2. Description of the Prior Art

The effect of humidity changes on optimum spark timing is discussed in Nakajima, K., K. Shinoda, and K. Onoda, "Experiments on Effects of Atmospheric Conditions on the Performance of an Automotive Gasoline Engine," SAE paper 690166 and Gardiner, A. W., "Atmospheric Humidity and Engine Performance," *SAE Trans.*, Vol. 24 (1929).

The effect of altitude changes on optimum spark timing is disclosed by Hubbard, M., "Applications of Automatic Control to Internal Combustion Engines," Ph.D. Dissertation, Guidance & Control Lab., Stanford University, Stanford, California 1975. Other efforts to control ignition timing in accordance with variations in power demands and ambient conditions have been disclosed in the following references:

Draper, C. D., and Y. T. Li, "Principles of Optimalizing Control Systems and an Application to the Internal Combustion Engine." ASME Publication, Sept. 1951.

Schweitzer, P. H., C. Volz, and F. DeLuca, "Control System to Optimize Engine Power," SAE paper 660022.

Schweitzer, P. H., and C. Volz, "Electronic Optimizer Control for Internal Combustion Engines," SAE Paper No. 750370, Feb. 1975.

SUMMARY OF THE INVENTION

The principal object of the present invention is to provide an ignition control system that is capable of controlling ignition timing for variations in power requirements and ambient operating conditions. Achievement of this object is made possible by the discovery that maintaining constant the angular position of peak cylinder pressure compensates for and optimizes engine performance for variations in all such operating conditions.

Another object is to provide an apparatus for automatically adjusting the spark timing in an internal combustion engine to maintain the angular position of peak cylinder pressure constant. A feature and advantage of controlling ignition timing on the basis of a constant angular position of peak cylinder pressure is that variations in humidity and altitude are compensated for without directly measuring such quantities to the end that fuel consumption and exhaust emissions are minimized throughout all power ranges and ambient conditions.

In confirming the discovery that maintenance of a constant angular position of peak cylinder pressure achieves the salutary advantages referred to above, tests were made on a single cylinder laboratory engine at five rpm ranges between 600 rpm and 1800 rpm, three air flow ranges between 50 and 100%, five fuel-air ratios in the range of $\phi$ ($\phi$ = fuel-air equivalence ratio) between 1.1 and 0.7 and four spark advances, MBT (minimum spark advance for best torque), $-10°$, $-20°$ and $+10°$. At each controll setting within the above enumerated ranges, CO, HC, $NO_x$, BSFC, BMEP, magnitude of peak cylinder pressure, and position of peak cylinder pressure were measured. The data collected were fit into an analytical model of the form:

$$y = A + B_i u_i + C_i u_i^2 + D_i u_i^3 + E_i u_i^2 u_j + F_i u_i^2 j$$

where
- $u_i$ = engine rpm
- $u_2$ = percent of throttle
- $u_3$ = fuel-air ratio
- $u_4$ = spark advance.

Employment of the foregoing model to evaluate various control schemes vertified that the position of peak cylinder pressure bears a relationship to minimum spark advance for best torque that compensates for variation in engine power and ambient atmospheric conditions. By employment of the above analytical model, it was determined that the position of peak cylinder pressure (in degrees after top dead center) at the angle of minimum spark advance for best torque is given by the following equation: $PPSN_{opt} = 15.7 - (rpm - 1200/400) - 4.5 (\phi - 0.97)$, in which PPSN iw equal to the optimum angular position of peak cylinder pressure. The optimum angle of peak cylinder pressure is thus shown to be practically constant over the entire engine operating range, the biggest variation being due to variations in engine rpm. More specifically, it was found that the angular position of peak cylinder pressure varied by about 1.5° for a change of 600 rpm. The effect of variations in $\phi$ and other terms are much smaller and are considered insignificant.

Accordingly, a method and apparatus were conceived for maintaining the angular position of peak cylinder pressure constant by sensing the deviation of the angular position of peak cylinder pressure from a preselected set point and by varying the angle of ignition to minimize or reduce the amount of such deviation. The foregoing, together with other objects, features and advantages, will be more apparent after referring to the following specification and the accompanying drawings.

DESCRIPTION OF THE PREFERRED EMBODIMENT

Figure 1:
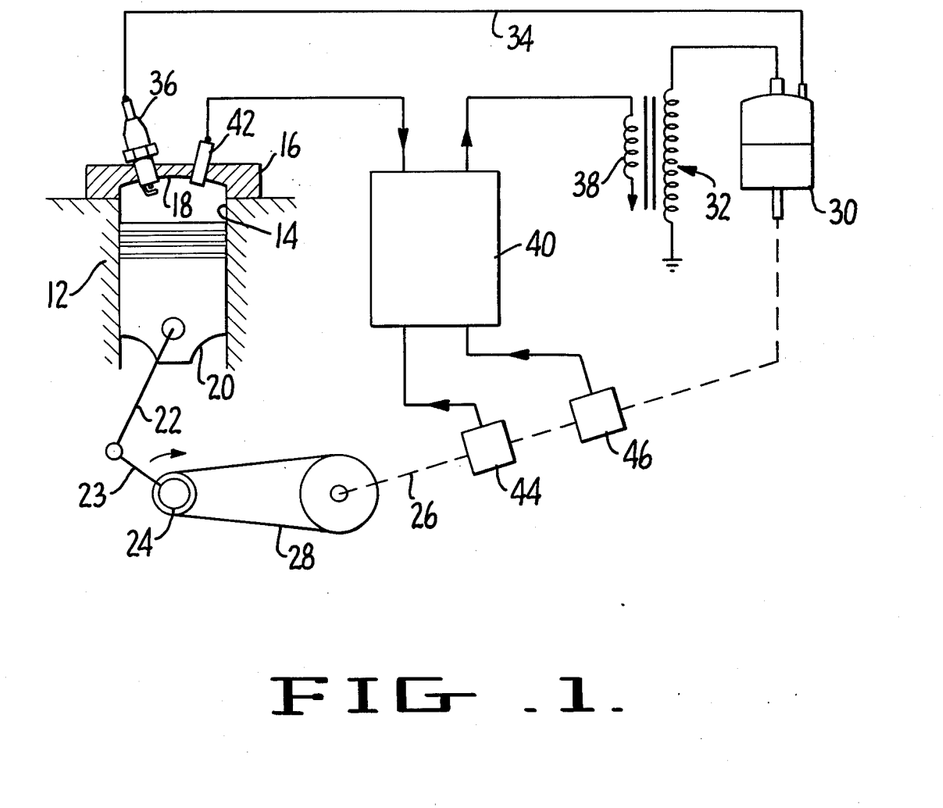
FIG. 1 is a diagrammatic view of a typical internal combustion engine equipped to practice the present invention.

Referring more particularly to the drawings, reference numeral 12 schematically indicates the block of an internal combustion engine which has at least one cylinder 14, a cylinder head 16 and a combustion chamber 18. A piston 20 is supported for reciprocation in cylinder 14 by a connecting rod 22 which connects the piston to a crank 23 of crankshaft 24. Crankshaft 24 drives a cam shaft 26 through a suitable drive train such as a chain and sprocket assembly 28. Cam shaft 26 drives a distributor 30 which has a rotor (not shown) for distributing a high voltage pulse from a coil 32 over a conductor 34 to a spark plug 36 within combustion chamber 18. Coil 32 has a primary or low voltage winding 38 which is energized by a circuit 40 that embodies the present invention.

As shown in FIG. 1, circuit 40 has an input from a cylinder pressure sensor 42, an input from a rotative position sensor 44, secured to cam shaft 26, and a rotative position sensor 46 also attached to the cam shaft. Circuit 40 processes the signals from pressure sensor 42 and rotative position sensors 44 and 46 to excite low voltage winding 38 at the proper time depending on engine load demands and ambient operating conditions.

Pressure sensor 42 can take any one of a number of forms so long as an electric signal having a magnitude proportional to the pressure within combustion chamber 18 is produced. For example the pressure sensor can employ a strain gauge device, a diaphragm inductance device, a magnetostrictive device or the like, the constructional details of the pressure sensor per se constituting no part of the present invention.

Rotative position sensors 44 and 46 can be of any suitable form so long as an electric pulse is produced at a desired position of crankshaft 24. For example, the rotative position sensors can include a light source, a photo cell, and means, such as a slotted disc mounted on cam shaft 26, for effecting excitation of the photo cell by the light source at a preselected rotative position of the cam shaft. In the specific embodiment of circuit 40 that is described hereinbelow rotative position sensor 44 produces a signal at 50° before top dead center (BTDC) and position sensor 46 produces an electric signal at 15.7° after top dead center (ATDC), the latter being characterized for convenience as the set point.

Figure 2:
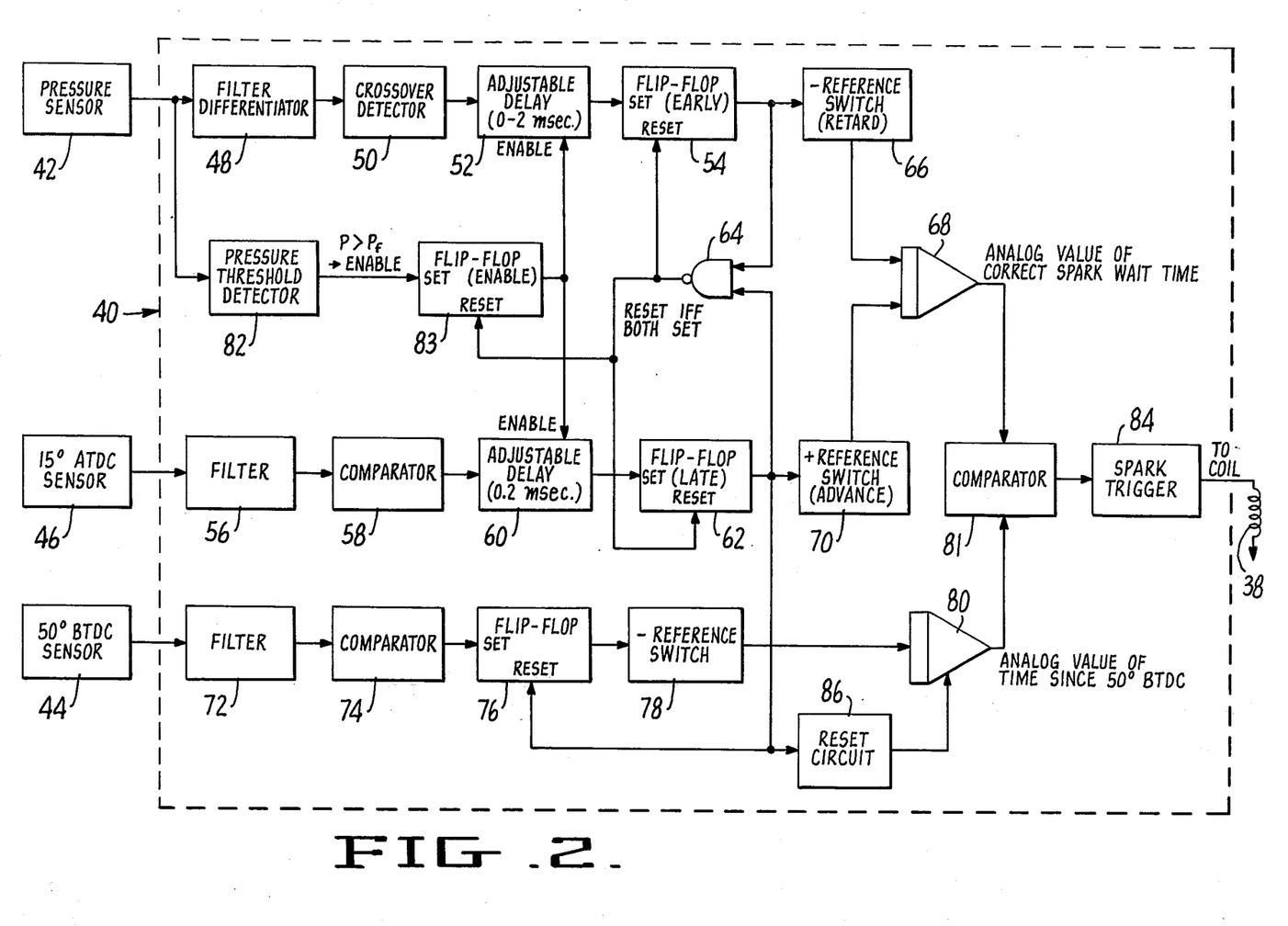
FIG. 2 is a block diagram of one satisfactory embodiment of an ignition control system of the invention.

Referring now to FIG. 2, the output of pressure sensor 42, which is a signal having a magnitude that varies in proportion to variation of pressure within the cylinder, is connected to a filter-differentiator circuit 48 which functions to eliminate noise and like spurious signals from the pressure transducer and a signal having a magnitude proportional to the derivative of the cylinder pressure sensed by the pressure sensor. Such signal is connected to a crossover detector 50 which produces an output when the signal from filter-differentiator 48 crosses zero, i.e. changes polarity. Accordingly, the output of crossover detector 50 is a pulse which occurs at the angular position of peak cylinder pressure. Such pulse is fed through a delay circuit 52 which can be adjustable to accommodate the invention to different engines, but which once adjusted, remains constant during operation of the system. As will appear in more detail hereinafter, the presence of delay circuit 52 makes the system rpm dependent in order to achieve the necessary spark advance for increases in rpm. The delayed signal from delay circuit 52 is then fed to the input of a flip-flop 54, which flip-flop sets in response to the occurrence of peak cylinder pressure.

Rotative position sensor 46 establishes a set point or a reference point with which the position of peak cylinder pressure is made to coincide by appropriate adjustment of the spark timing. The specific angular position of the pulse produced by rotative position sensor 46 is herein exemplified at 15.7°, such position being of a magnitude dictated by the specific characteristics of the engine on which the system is installed. The output of sensor 46 is a pulse which occurs at a fixed angular position of crankshaft 24, and the pulse is filtered by a filter circuit 56 to eliminate noise and like spurious signals. Further immunity from noise and the like is achieved by connecting the signal through a comparator 58 so that an output signal is achieved only when the magnitude of rotative position sensor 46 exceeds some preselected bias magnitude. The output of comparator 58 is then fed to a fixed time delay 60, which makes the system sensitive to rpm variations and which will be described in somewhat more detail hereinbelow. Finally, the delayed signal indicative of the set point is employed to set a flip-flop 62, the output of which provides a logic signal that is set at a time corresponding to the angular position of the set point.

The outputs of flip-flops 54 and 62 are connected to the inputs of a rest inverting AND gate 64 which functions to combine the outputs of flip-flops 54 and 62 so that those flip-flops are reset only after both flip-flop 54 and flip-flop 62 have been set. If flip-flop 54 is set first, such condition indicates that the position of peak cylinder pressure sensed by pressure sensor 42 occurs earlier than the set point established by rotative position sensor 46. If, on the other hand, flip-flop 62 is set first, this indicates that the position of the peak cylinder pressure has occurred too late, i.e. after the set point. The duration that the earliest-to-set-flip-flop is turned on is proportional to the deviation of the position of peak cylinder pressure from the set point and the particular flip-flop that is first set indicates the direction of the deviation.

The output of flip-flop 54 is connected to a negative reference switch 66 which supplies to the input of an integrator 68 a relatively negative signal level. The output of flip-flop 62 is connected to a positive reference switch 70 which supplies a relatively positive signal to the input of integrator 68. Accordingly, the output of the integrator 68 is a voltage level whose magnitude changes based on the amount and direction by which the position of peak cylinder pressure deviates from the set point. Such output is used in conjunction with circuitry to be described to advance or retard the spark produced by coil 32 to make the position of peak cylinder pressure coincide with the set point.

Rotative position sensor 44 produces a signal at a fixed angular position of crankshaft 24 before top dead center, an angle of 50° BTDC exemplifying a suitable magnitude. The output of rotative position sensor 44 is connected through a filter 72 and a comparator 74, corresponding in function to filter 56 and comparator 58, respectively, to a flip-flop 76 in order that the flip-flop is set at 50° before top dead center. The output of flip-flop 76 triggers a negative reference switch 78 which is connected to the input of an integrator 80. Integrator 80 produces a signal having a magnitude proportional to the angular position after the 50° BTDC crankshaft position and is connected to one input of a comparator 81. Connected to the other input of comparator 81 is the output of integrator 68 so that comparator 81 produces an output when the output of integrator 68 coincides in magnitude with the output of integrator 80. The output of comparator 81 is connected to a spark trigger circuit 84 which activates low voltage coil winding 38 for firing spark plug 36 at the appropriate time to reduce the deviation of the position of peak cylinder pressure from the set point. In order to restore the circuit for operation during subsequent power strokes of piston 20, flip-flop 76 and integrator 80 are reset in response to the setting of flip-flop 62, an integrator reset circuit 86 being provided to facilitate this function.

The ignition timing control system of the invention is deactivated should spark plug 36 fail to fire for some reason. Failure of ignition of the fuel-air mixture within combustion chamber 18 prevents generation of substantial pressure within the chamber. Connected to the output of pressure sensor 42 is a pressure threshold detector 82, which produces an output if, and only if, the pressure sensed by pressure sensor 42 exceeds a threshold pressure of a given magnitude, such magnitude being less than the pressure developed upon ignition of the fuel-air mixture in the combustion chamber and greater than the pressure developed in the cylinder during the compression stroke of piston 20. When the pressure exceeds such threshold pressure, pressure threshold detector 82 produces an output which sets a flip-flop 83. When flip-flop 83 sets, it enables delay circuits 52 and 60 so that the signals supplied to the delay circuits will pass therethrough. Flip-flop 83 is reset from gate 64 simultaneously with the resetting of flip-flops 54 and 62.

Figure 3:
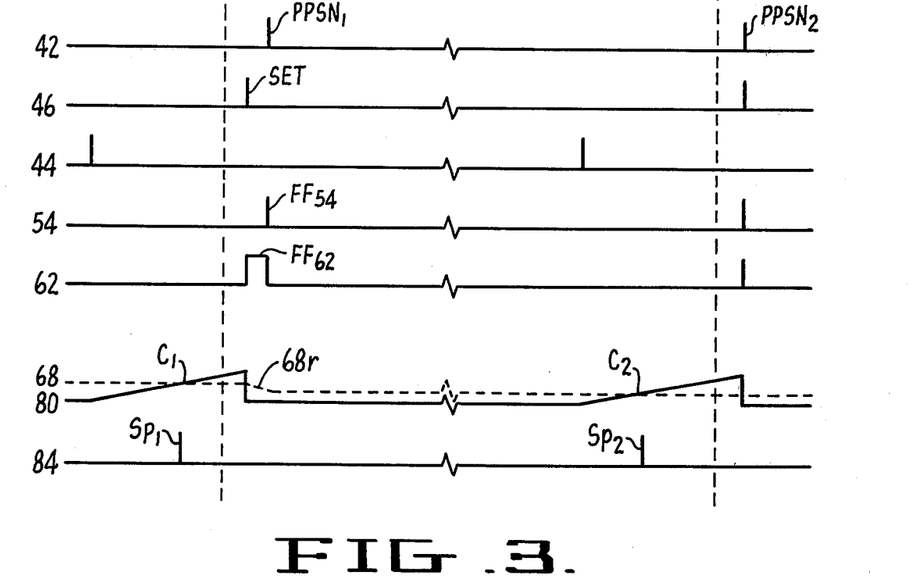
FIG. 3 is a timing diagram showing operation of the system of FIG. 2.

In further explanation of the operation of the system in FIG. 2, reference is invited to the timing diagram of FIG. 3. In FIG. 3 the abscissa can be considered as either the angular position of the crankshaft or time, because the timing diagram of the figure assumes no change in engine rpm. Two successive firings of spark plug 36 are shown, the first identified at $Sp_1$ occurring tardily in response to tardy occurrence of coincidence between integrator 68 and 80 ($C_1$) because of some change in engine load or ambient conditions. The consequence of tardy occurrence of spark $Sp_1$ is that the position of peak cylinder pressure $PPSN_1$ is later than, or deviates from, the set point indicated at Set in FIG. 3. The foregoing causes flip-flop 62 to be set first, in response to the occurrence of the set point detected by rotative sensor 46. When flip-flop 62 sets, it activates reference switch 70 to effect a reduction in the output of integrator 68. This reduction, which is indicated at $68r$, continues until the angular position of peak cylinder pressure sets flip-flop 54, which in turn resets that flip-flop and flip-flop 62. Accordingly, the output of integrator 68 is reduced. Thereafter rotative position sensor 44 turns on integrator 80, and because of the now reduced magnitude of the output of integrator 68, coincidence occurs earlier at $C_2$ in consequence of which the timing of the spark at $Sp_2$ occurs earlier. This advances the occurrence of the position of peak cylinder pressure, indicated at $PPSN_2$, so as to eliminate the deviation between the position of peak cylinder pressure and the set point. Consideration of FIGS. 2 and 3 indicates that if the position of peak cylinder pressure occurs early, i.e., before the occurrence of the set point, the magnitude of the output of integrator 68 will increase whereupon coincidence at the inputs of comparator 81 and the time of occurrence of the spark triggered by spark trigger circuit 84 will be retarded so as to reduce or eliminate the deviation between the position of peak cylinder pressure and the set point. Because of the discovery that the position of peak cylinder pressure reflects variations in humidity, altitude and like ambient conditions, the method and apparatus of the invention, by timing the spark to restore such position to a set point, automatically compensates for variations in such conditions without requiring direct measurement of such conditions.

Figure 3A:
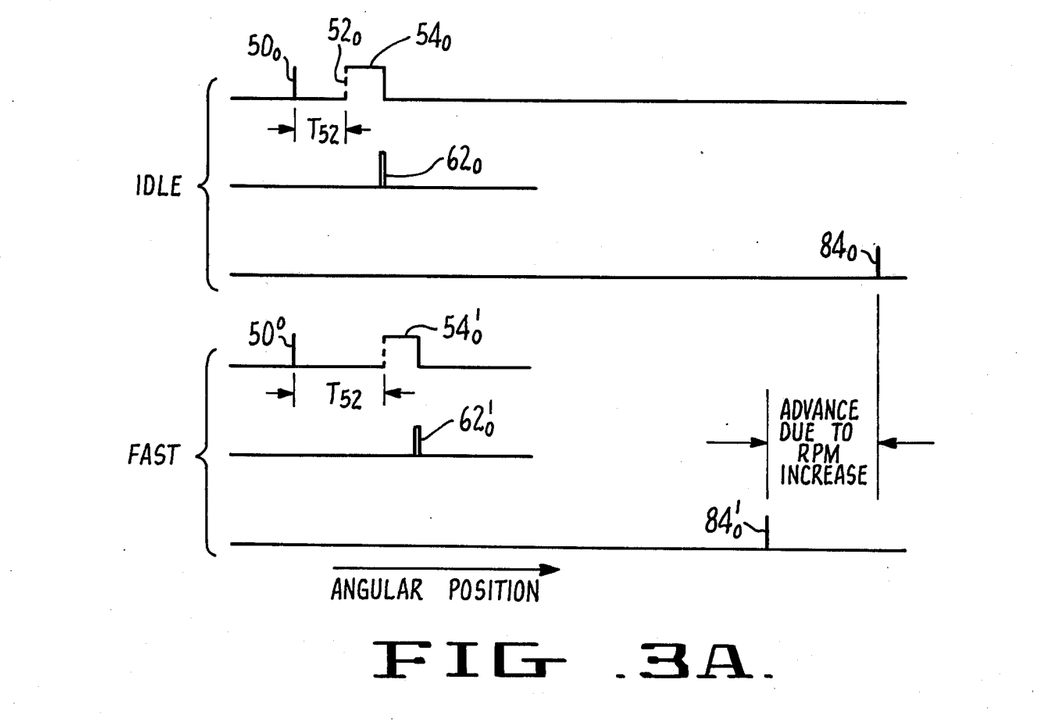
FIG. 3A is a timing diagram illustrating operation of the system of FIG. 2 in advancing the spark for increased rpm.

FIG. 3A, taken in conjunction with FIG. 2, illustrates the rpm dependence of the apparatus of the invention. In FIG. 3A the absicca or horizontal axis represents angular position. The upper curves on the figure represent circuit operation at idle speed, and the lower set of curves represent operation at some faster speed. In the figure pulse $50_O$ represents the output of crossover detector 50 which corresponds to the time of the position of peak cylinder pressure. After elapse of a fixed time interval, identified in FIG. 3A as $T_{52}$ and occurring as a result of time delay circuit 52, flip-flop 54 is set so that the output $54_O$ of the flip-flop is set as shown in the figure. Output $54_O$ is reset upon setting of flip-flop 62 (the set point), such being shown in the figure at $62_O$. If the speed of the engine is now increased, the fixed time interval $T_{52}$ represents a greater portion of the angular rotation of the engine crankshaft. Accordingly and although flip-flop 54 is set after the same time delay interval from the occurrence of the position of peak cylinder pressure, the number of degrees of crankshaft rotation before flip-flop 54 becomes set is increased. The increased angular duration corresponding to $T_{52}$ results in an increased angular delay in the generation of the peak pressure signal. In order to align this delayed position of peak pressure with the set point, the spark is advanced as identified at $84_O'$ in FIG. 3A. The horizontal distance between spark trigger $84_O$ and spark trigger $84_O'$ is shown in FIG. 3A and represents the number of degrees of advance to optimize engine operation at a faster speed. Although for a given engine only one of the time delay circuits 52, 60 is necessary, the presence of both delay circuits permits a single system to be adapted to different engines having different operating conditions.

The close correspondence between optimum calculated variations in engine parameters and variations of such parameters achieved with the present invention are shown in FIGS. 4–7. In all figures it will be noted that the correspondence is extremely close.

Figure 4:
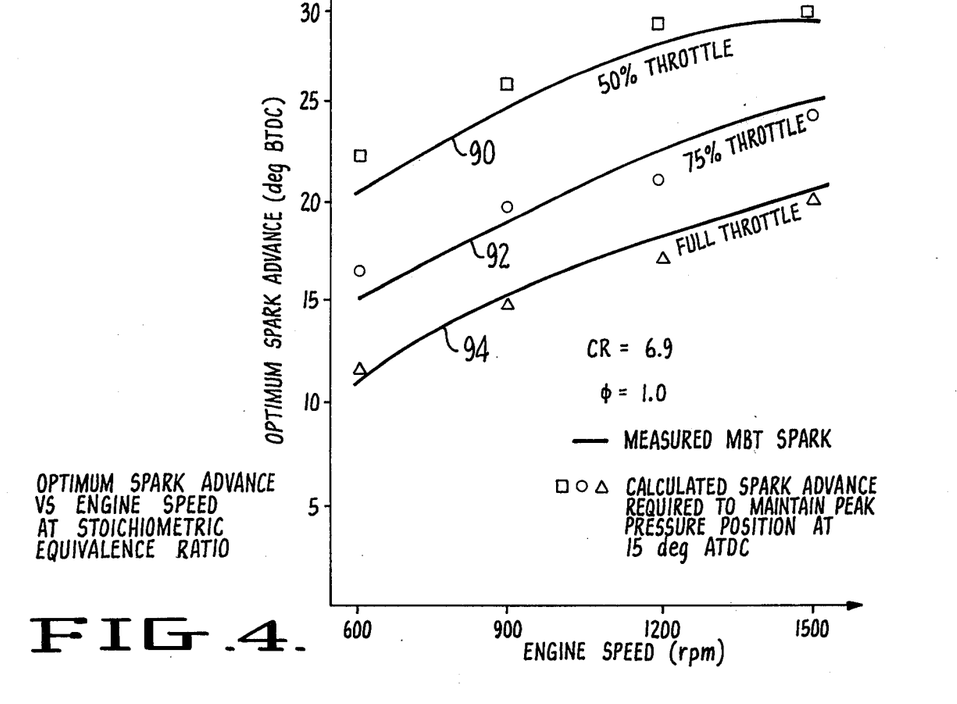
FIG. 4 is a plot of optimum spark advance against engine speed comparing measured interrelationships between the two quantities for three power settings with equivalent correlations predicted in accordance with the method and apparatus of the invention.

In FIG. 4 the curves represent the measured minimum or optimum angle of spark advance for best torque in the engine used for the studies. Curve 90 represents such measurement at a 50% throttle setting, curve 92 represents such measurement at a 75% throttle setting and curve 94 represents such measurement at a full throttle setting. The points adjacent the respective curves at the 600, 900, 1200 and 1500 rpm speeds represent the spark advance values that would result if the peak pressure was maintained according to this invention. The curves show extremely close correspondence between the optimum and that provided by the device being described.

Figure 5:
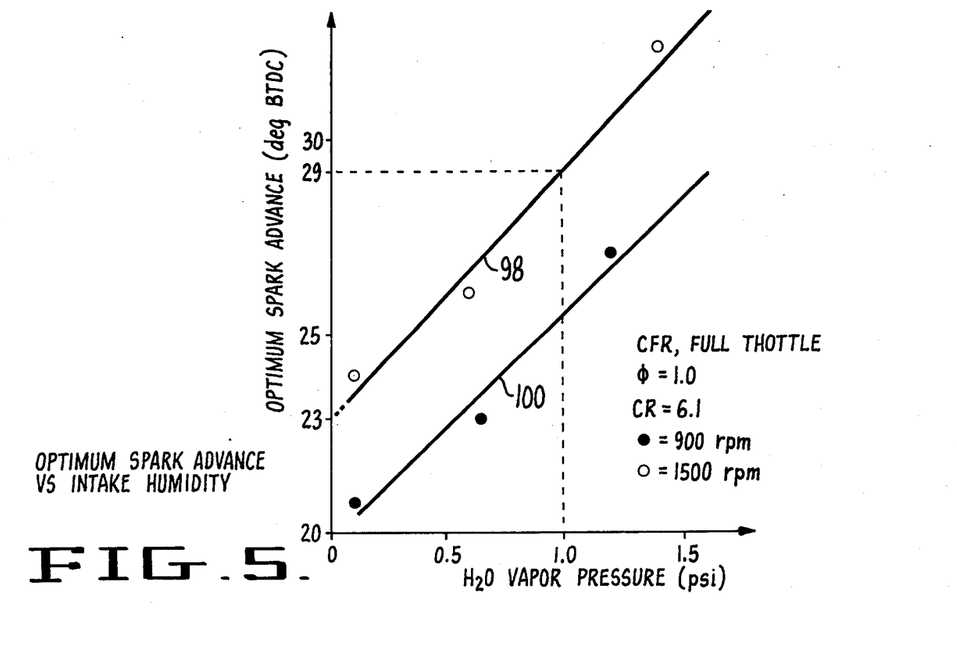
FIG. 5 is a plot of optimum spark advance in degrees before top dead center against water vapor pressure in PSI or intake humidity comparing measured correlations between the quantities with correlations resulting from practice of the invention.

FIG. 5 shows the optimum spark advance for variations in humidity, plotted as water vapor pressure in psi on the abscissa of FIG. 5. Curve 98 indicates observed engine operation at 900 rpm for wide variations in humidity and curve 100 indicates engine operation at 1500 rpm for substantially the same humidity range.

Figure 6:
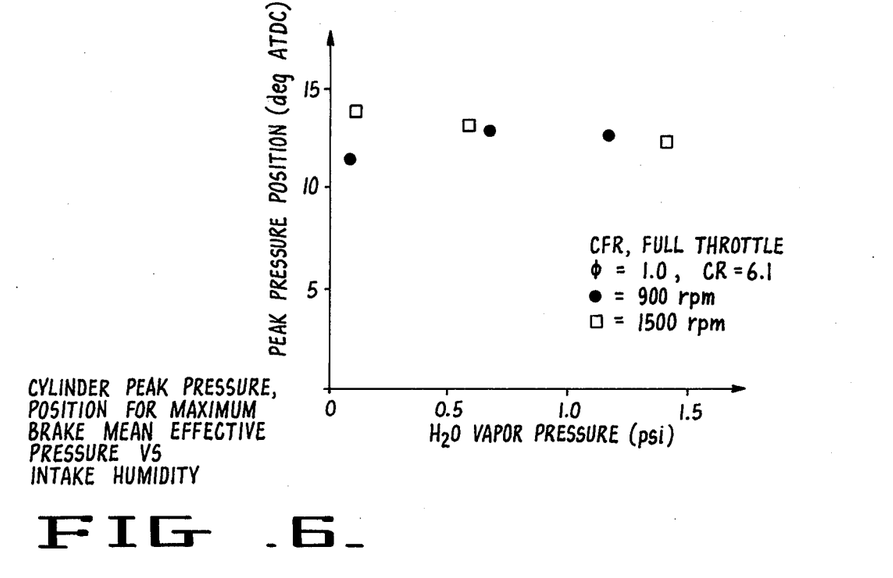
FIG. 6 is a plot of position of peak cylinder pressure in degrees after top dead center versus water vapor pressure for two engine speeds.

FIG. 6 illustrates the excellent control afforded by the invention and the fact that the invention affords optimization of brake mean effective pressure (bmep) for variations in ambient humidity and in engine rpm. The graph of FIG. 6 shows engine operation at full throttle, the squares designating points where the engine is rotating at 1500 rpm and the circles designating operating points where the engine is rotating at 900 rpm. Except for a minor divergence at water vapor pressures below about 0.3–0.4 psi, the invention provides excellent spark advance for varying humidity and rpm conditions by regulating the spark advance in a direction and by an amount to reduce or eliminate the deviation between the position of peak cylinder pressure and the set point.

Figure 7:
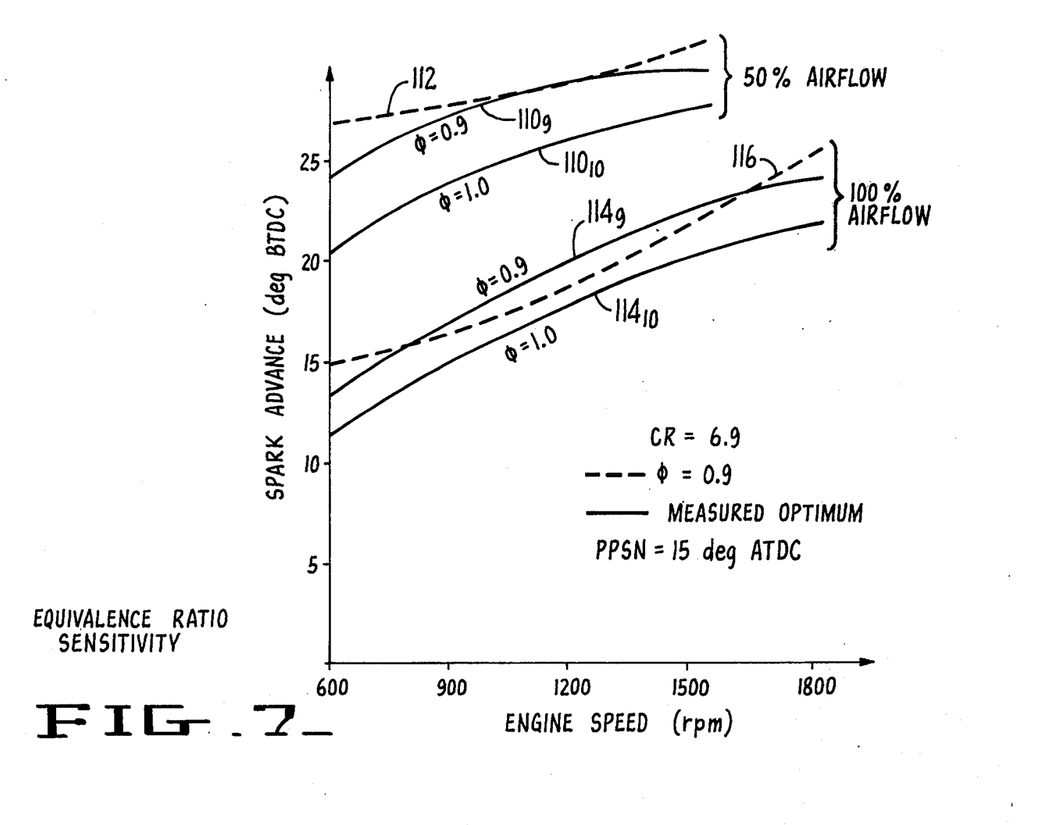
FIG. 7 is a plot of spark advance in degrees before top dead center versus engine speed for two air flows comparing measured correlations with correlations provided by the method and apparatus of the invention.

FIG. 7 shows that the present invention affords excellent spark advance control for variations in the equivalence ratio of the fuel-air mixture as occur from barometric changes and from operation of a given engine at different altitudes. The upper curves $110_9$ and $110_{10}$ represent optimum values at 50% air flow, curve $110_9$ corresponding to $\phi = 0.9$ and curve $110_{10}$ corresponding to $\phi = 1.0$. The spark advance afforded by the invention for $\phi = 0.9$ is designated by the broken line 112, which is acceptably close to curves $110_9$ and which demonstrates that the invention adequately controls timing to compensate for changed fuel-air ratios. Curves $114_9$ and $114_{10}$ show optimum spark advance for 100% air flow, curve $114_9$ corresponding to $\phi = 0.9$ and curve $114_{10}$ corresponding to $\phi = 1.0$. Curve 116 depicts the spark advance achieved in accordance with the present invention for $\phi = 0.9$ and shows ignition timing control that adequately compensates for changed fuel-air ratios at 100% air flow.

It will thus be seen that adjusting spark timing to maintain substantially constant the angular position of peak cylinder pressure optimizes engine performance through variations in speed and load conditions and for variations in ambient conditions. Because the position of peak cylinder pressure can be measured directly with extremely simple sensors and can be compared with and adjusted to other engine conditions, the invention affords an extremely useful method and apparatus which can be readily incorporated into existing engines, irrespective of the specific operating conditions of the engine. Employment of rather well understood logic techniques, which can be implemented in extremely small compact and rugged circuits, permits the implementation of the invention to improve engine operation and fuel economy and to reduce exhaust emissions.

Although, as has been shown above, the apparatus of the invention is capable of timing ignition for all engine operating conditions, it can be used in combination with existing advance machanisms such as the centrifugal advance mechanisms employed in existing distributors. Thus the apparatus and method of the invention can be incorporated into existing engines with minimal replacement of existing parts therein.

Other studies have shown that spark advance in engines employing existing advance control devices can easily be in error by 10° to 15° which results in efficiency losses on the order of 5 to 8%. Employment of the invention reduces the foregoing errors and efficiency losses significantly and does so in a straightforward, uncomplicated manner. Although one embodiment of the invention has been shown and described, it will be obvious that other adaptations and modifications can be made without departing from the true spirit and scope of the invention.

What is claimed is:

1. Apparatus for controlling the timing of ignition of an internal combustion engine to accommodate variations in ambient conditions, said apparatus comprising means for sensing the angular position of peak cylinder pressure, means responsive to said position sensing means for producing a signal proportional to the angular deviation of the position of peak cylinder pressure from a preselected angular set point, said signal producing means including a first flip-flop responsive to said sensing means so as to be switched to a set state coincidentally with the angular position of the peak cylinder pressure, a second flip-flop arranged to be switched to a set state coincidentally with the angular position of the preselected set point, means ffor resetting said first and second flip-flops when both said flip-flops have been switched to the set state so that the duration at the earliest of said first and second flip-flops to set corresponds to the duration of the signal produced by said signal producing means, means for producing a signal level having a magnitude proportional to the duration of the set time of the earliest to set of said first and second flip-flops and to the identity of the earliest to set of said first and second flip-flops, and means responsive to said signal producing means for varying the time of ignition to restore the position of peak cylinder pressure to the set point, said ignition time varying means including means for initiating a linearly increasing signal at a fixed angular position before a top dead center position so that the magnitude of said linearly increasing signal is proportional to the angular engine position after said fixed angular position, means for comparing the magnitude of said linearly increasing signal with the magnitude of the integral of said signal level, and means responsive to said comparing means for effecting ignition when the magnitude of said linearly increasing signal and said signal level integral coincide.

2. Apparatus according to claim 1 including means connected between said angular position sensing means and said signal producing means for delaying the sensed angular position of peak cylinder pressure by a fixed time interval so that said time interval corresponds to a greater angular rotation of said engine for greater rotational speeds so as to advance or retard the angular position of ignition in proportion to rotative speed of the engine.

3. Apparatus for controlling the timing of ignition in an internal combustion engine to accommodate variations in ambient conditions comprising peak cylinder pressure sensing means including a pressure sensor for producing an electric pressure signal having a magnitude proportional to the cylinder pressure; means connected to said pressure sensor for generating a signal proportional to the rate of change of said pressure signal with respect to crankshaft angular position so that the output of said signal generating means is a pressure signal having a magnitude proportional to the rate of change of cylinder pressure; a first polarity when the cylinder pressure is increasing, and a second and opposite polarity when the cylinder pressure is decreasing; means connected to said signal generating means for detecting when the output thereof changes from the first polarity to the second polarity, said detecting means producing a peak signal at the angular position of peak cylinder pressure; means connected to said detecting means for producing a control signal proportional to the angular deviation of the peak signal from a preselected angular set point, and means responsive to said control signal producing means for varying the time of ignition to restore the position of peak cylinder pressure to the said point.

4. A method for controlling the spark advance in an internal combustion engine comprising the steps of continuously sensing the cylinder pressure to produce a pressure signal that varies with crank shaft rotation, producing a control signal that crosses over from positive polarity to negative polarity when the pressure signal corresponds to the angular position of peak cylinder pressure, detecting the angular position of cross over, generating an angular signal at the angular position of peak cylinder pressure, comparing the angular signal with a preselected angular set point, and adjusting the angular position of engine ignition to reduce the deviation of the position of the angular signal from the set point.

* * * * *